United States Patent
Dissette et al.

(10) Patent No.: US 11,169,373 B2
(45) Date of Patent: Nov. 9, 2021

(54) CLEANING DEVICE FOR AN IMAGING SENSOR

(71) Applicant: Continental Automotive Systems, Inc., Auburn Hills, MI (US)

(72) Inventors: Matthew Joseph Dissette, Washington Township, MI (US); Michael J Zaitz, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 31 days.

(21) Appl. No.: 16/181,023

(22) Filed: Nov. 5, 2018

(65) Prior Publication Data

US 2019/0072761 A1   Mar. 7, 2019

Related U.S. Application Data

(63) Continuation of application No. PCT/US2017/030766, filed on May 3, 2015.

(51) Int. Cl.
| | | |
|---|---|---|
| *B08B 1/00* | (2006.01) | |
| *G02B 27/00* | (2006.01) | |
| *B60S 1/56* | (2006.01) | |

(52) U.S. Cl.
CPC ............ *G02B 27/0006* (2013.01); *B08B 1/00* (2013.01); *B60S 1/56* (2013.01); *B60S 1/566* (2013.01)

(58) Field of Classification Search
CPC ........ G02B 27/0006; B60S 1/56; B60S 1/566; B08B 1/00; B08B 1/006; B08B 3/04
See application file for complete search history.

(56) References Cited

U.S. PATENT DOCUMENTS

| | | | |
|---|---|---|---|
| 9,382,440 B2 * | 7/2016 | Shimshon | G02B 1/105 |
| 2002/0139394 A1 | 10/2002 | Bronson | |
| 2007/0247101 A1 * | 10/2007 | Noda | F03G 7/065 |
| | | | 318/582 |
| 2008/0022674 A1 * | 1/2008 | Brown | F03G 7/065 |
| | | | 60/527 |
| 2010/0212689 A1 | 8/2010 | Tetsurou | |
| 2013/0146577 A1 * | 6/2013 | Haig | H04N 5/2251 |
| | | | 219/202 |
| 2013/0209079 A1 | 8/2013 | Alexander et al. | |
| 2014/0270379 A1 | 9/2014 | Snider | |

(Continued)

FOREIGN PATENT DOCUMENTS

| | | |
|---|---|---|
| CN | 101438200 A | 5/2009 |
| CN | 101682689 A | 3/2010 |

(Continued)

OTHER PUBLICATIONS

International Search Report and Written Opinion dated Aug. 7, 2017 from corresponding International Patent Application No. PCT/US2017/030766.

(Continued)

*Primary Examiner* — Sharidan Carrillo

(57) ABSTRACT

A cleaning device for cleaning a sensing element of a vehicular camera includes a cleaning element movable between a first position and a second position to contact a surface of the sensing element. The cleaning device also includes a mechanism coupled to the cleaning element to move the cleaning element between the first position and the second position.

5 Claims, 10 Drawing Sheets

(56) References Cited

U.S. PATENT DOCUMENTS

| | | | |
|---|---|---|---|
| 2015/0202663 A1* | 7/2015 | Oba | B08B 5/00 |
| | | | 348/375 |
| 2015/0246660 A1 | 9/2015 | Seedall et al. | |
| 2015/0321621 A1* | 11/2015 | Van Dan Elzen | B60S 1/56 |
| | | | 348/148 |
| 2015/0353024 A1* | 12/2015 | Cooper | B60R 11/04 |
| | | | 348/148 |
| 2016/0103316 A1 | 4/2016 | Rousseau | |
| 2016/0208955 A1* | 7/2016 | Pinto, IV | B60S 1/52 |
| 2016/0272163 A1* | 9/2016 | Dreiocker | H04N 5/2257 |
| 2016/0315564 A1* | 10/2016 | Kotani | B60S 1/566 |
| 2019/0072761 A1* | 3/2019 | Dissette | B60S 1/56 |

FOREIGN PATENT DOCUMENTS

| | | |
|---|---|---|
| CN | 104471475 A | 3/2015 |
| CN | 104797971 A | 7/2015 |
| CN | 105499183 A | 4/2016 |
| DE | 102014220257 A1 | 4/2016 |
| WO | 2010031157 A1 | 3/2010 |
| WO | 2014/006500 A2 | 1/2014 |
| WO | WO-2014017178 A1 * 1/2014 ............... B08B 7/02 |
| WO | 2015/115129 A1 | 8/2015 |

OTHER PUBLICATIONS

Chinese First Office Action dated Sep. 3, 2020 for the counterpart Chinese Patent Application No. 201780041594.2.
Chinese Second Office Action dated Jul. 9, 2021 for the counterpart Chinese Patent Application No. 201780041594.2.

* cited by examiner

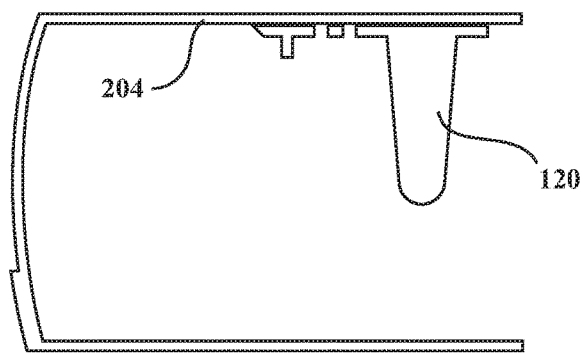
FIG. 3
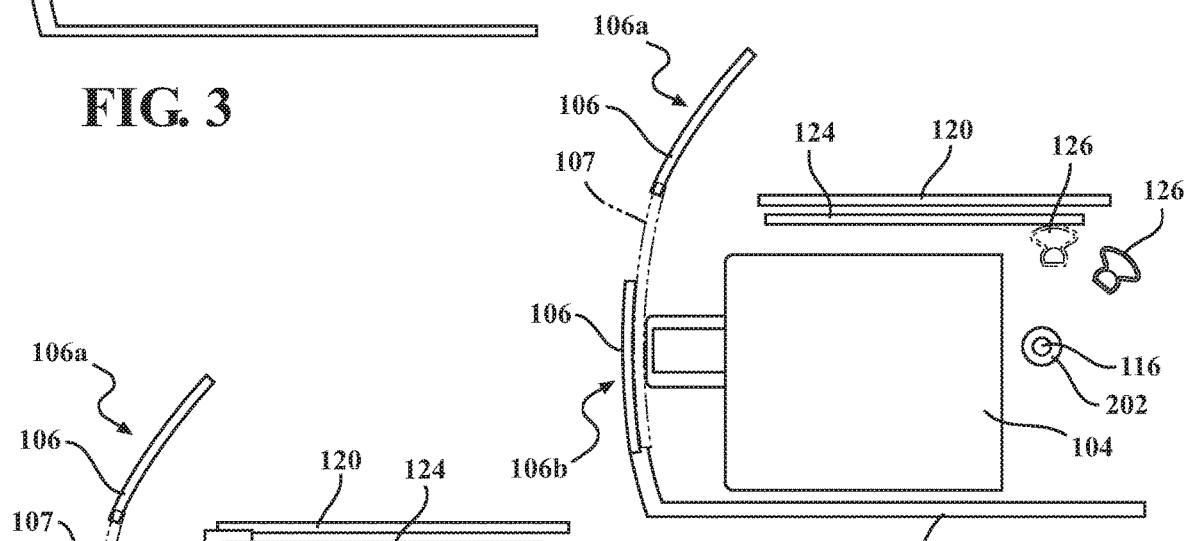
FIG. 4
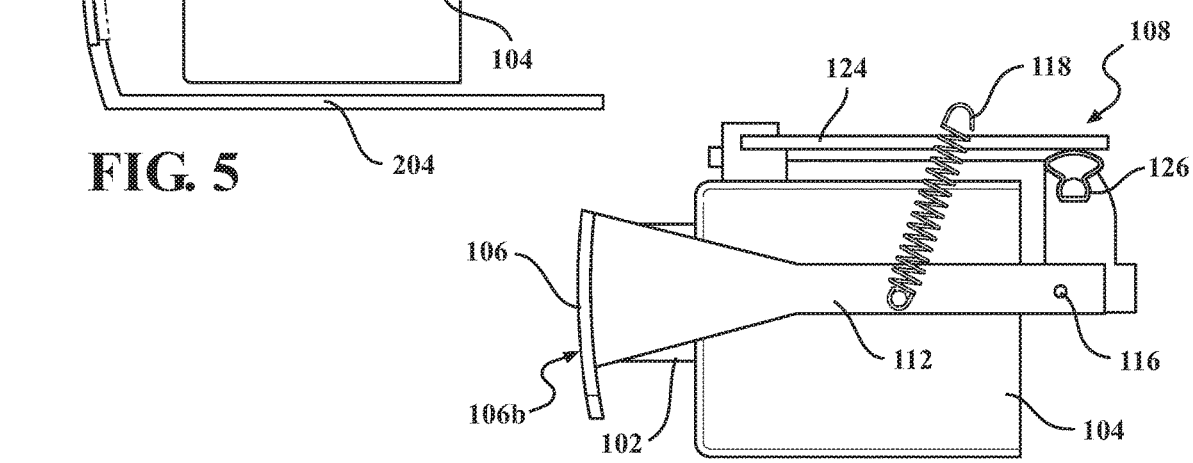
FIG. 5
FIG. 6

CLEANING DEVICE FOR AN IMAGING SENSOR

TECHNICAL FIELD

The technical field relates general to cleaning devices for imaging sensors and more particularly to cleaning devices for cameras on a vehicle.

BACKGROUND

Cameras and other imaging sensors may be integrated into automobiles and/or other vehicles for various purposes. These purposes include, but are not limited to, rear-view cameras for collision avoidance, assisted driving functions, and partial- or fully-autonomous driving.

Unfortunately, these cameras or imaging sensors may be obstructed, and thus lose functionality, due to water, snow, ice, dust, dirt, mud, and/or other substances. As such, there remains an opportunity to return these cameras or imaging sensors to a fully functional state with a cleaning device. In addition, other desirable features and characteristics will become apparent from the subsequent summary and detailed description, and the appended claims, taken in conjunction with the accompanying drawings and this background.

SUMMARY

In one exemplary embodiment, a cleaning device for cleaning a sensing element includes a cleaning element movable between a first position and a second position to contact a surface of the sensing element. The cleaning device also includes a mechanism coupled to the cleaning element to move the cleaning element between the first position and the second position.

In one exemplary embodiment, a method of operating a cleaning device for cleaning a sensing element, the cleaning device having a cleaning element movable between a first position and a second position to contact a surface of the sensing element and a mechanism coupled to the cleaning element to move the cleaning element between the first position and the second position, the method includes sensing a degradation of a signal supplied by the sensing element. The method also includes applying an electric current to a shape-memory alloy to actuate movement of the cleaning element in response to the sensing of the degradation of the signal.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 3 is a cross-sectional view of the cleaning device according to line A-A in FIG. 2;

FIG. 4 is a cross-sectional view of the cleaning device and camera according to line B-B in FIG. 2;

FIG. 5 is a cross-sectional view of the cleaning device and camera according to line C-C in FIG. 2;

FIG. 6 is a side view of the camera and the cleaning device with the cleaning element in one position according to one exemplary embodiment;

DETAILED DESCRIPTION

Figure 1:
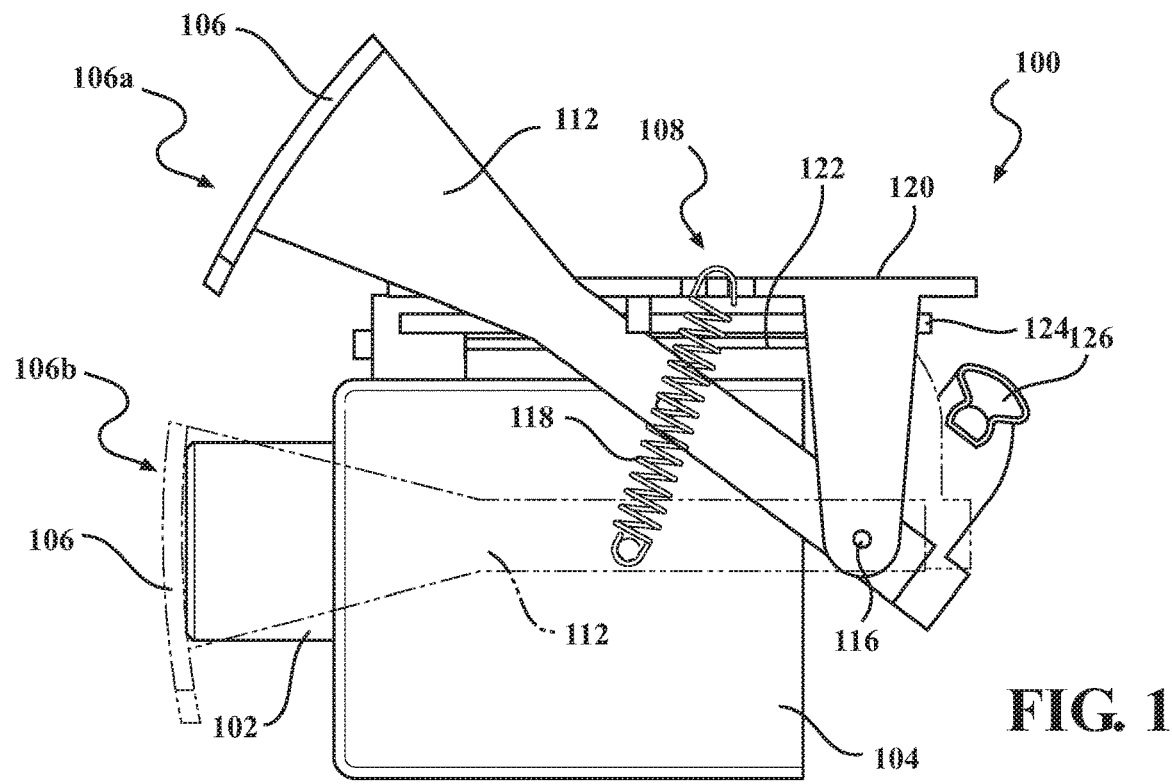
FIG. 1 is a side view of a camera and a cleaning device with a cleaning element in two different positions according to one exemplary embodiment.

Referring to the Figures, wherein like numerals indicate like parts throughout the several views, a cleaning device 100 for cleaning a sensing element 102 is shown herein.

In the illustrated embodiments, the sensing element 102 is a camera lens (not separately numbered) of a camera 104. The camera 104 may be utilized in a vehicle (not shown), e.g., an automobile, for viewing, sensing, and/or otherwise imaging the environment external from the vehicle. Those skilled in the art appreciate that such cameras 104 may be utilized as "back-up" cameras, in automated driving, and/or other emerging applications. Of course, the camera 104 may also be utilized in non-vehicular applications. Furthermore, the sensing element 102 may be any device utilized for sensing and not necessarily a camera lens.

The cleaning device 100 includes a cleaning element 106 movable between a first position (shown as 106a) and a second position (shown as 106b). It should be appreciated that the figures show a single cleaning element 106 simultaneously in the first position 106a and the second position 106b. However, multiple cleaning elements 106 could be implemented based on various factors appreciated by those skilled in the art. The cleaning element 106a, 106b is configured to contact a surface (not shown) of the sensing element 102 in at least one of the positions 106a, 106b and/or while moving between the positions 106a, 106b. The cleaning element 100 may include a fabric for providing the contact with the surface of the sensing element 102, e.g., the lens of the camera. As just one example, the fabric of the cleaning element 106 may be a micro-fiber cloth. In another exemplary embodiment, the cleaning element 100 may be formed from a rubber or similar substance. In the exemplary embodiments, the cleaning element 106 has a generally planar, or blade-like shape, similar to a windshield wiper blade. The cleaning element 106 may alternatively have a slightly arcuate shape to match the shape of the sensing element 102.

Figure 9:
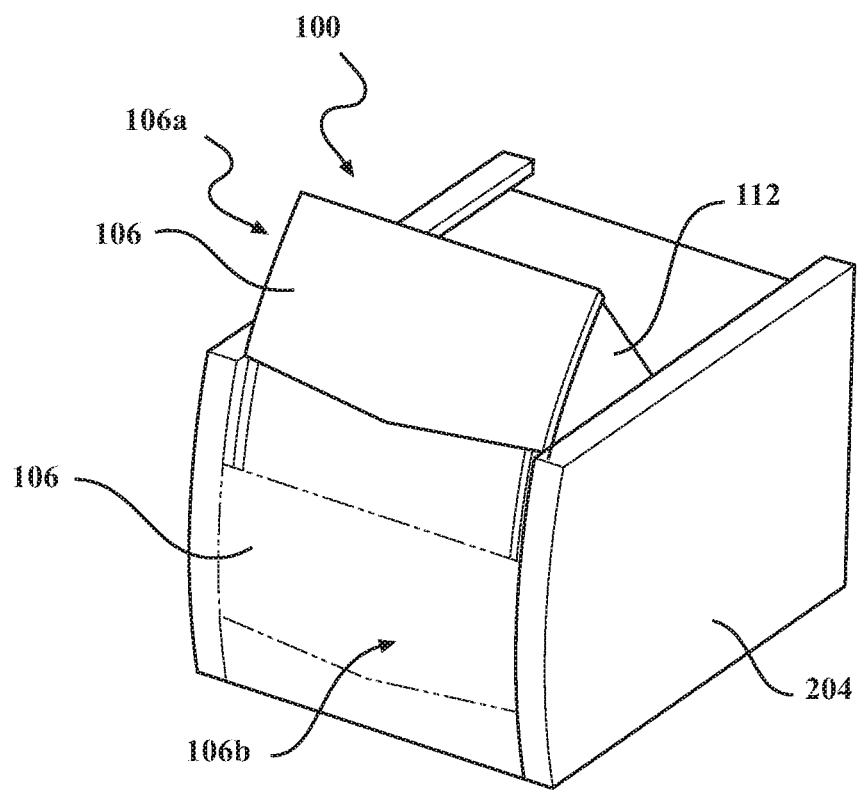
FIG. 9 is a front perspective view of the cleaning device and the camera without the housing according to one exemplary embodiment.

The cleaning device 100 may include a secondary lens 107, as seen in FIGS. 4, 5, and 9. This secondary lens is unmovable and permanently installed in front of the lens of the camera 104. In some embodiments, the cleaning element engages this secondary lens 107 instead of the lens of the camera 104, thus protecting the sensitive and often expensive lens of the camera 104.

The cleaning device 100 includes a mechanism 108 coupled to the cleaning element 106 to move the cleaning element 106 between the first position 106a and the second position 106b. In the exemplary embodiments, the mechanism 108 includes at least one arm 112, 200, 1100 coupled to the cleaning element 106 for supporting the cleaning element 106.

In the exemplary embodiment shown in FIGS. 1-10, the mechanism 108 includes a first side arm 112 and a second side arm 200 connected to opposite ends (not numbered) of the cleaning element 106. The side arms 112, 200 extend away from the cleaning element 106 and are coupled to and rotate about a pin 200 defining an axis 116. The mechanism 108 further includes at least one spring 118 coupled to at least one of the side arms 112, 200 to connect the respective side arm 112, 200 to a retainer bracket 120.

The mechanism 108 also includes an actuator (not numbered) for causing the movement of the cleaning element 106. In the exemplary embodiments, the actuator causes movement of the cleaning element 106 from the first position 106a to the second position 106b, while the spring 118 causes movement of the cleaning element 106 from the second position 106b to the first position 106a, when the actuator is deactivated. In the exemplary embodiments, the actuator includes a shape-memory alloy 122. As appreciated by those skilled in the art, the shape-memory alloy 122 is a material that changes shape (i.e., deforms) when heated and then returns to an un-deformed shape when no longer heated. The heating may occur by selectively electrifying, i.e., running a current through, the shape-memory alloy 112. The at least one spring 118 aids movement of the cleaning element 106 back to the first position 10a and returning the shape-memory alloy 122 back to its un-deformed state.

Figure 11:
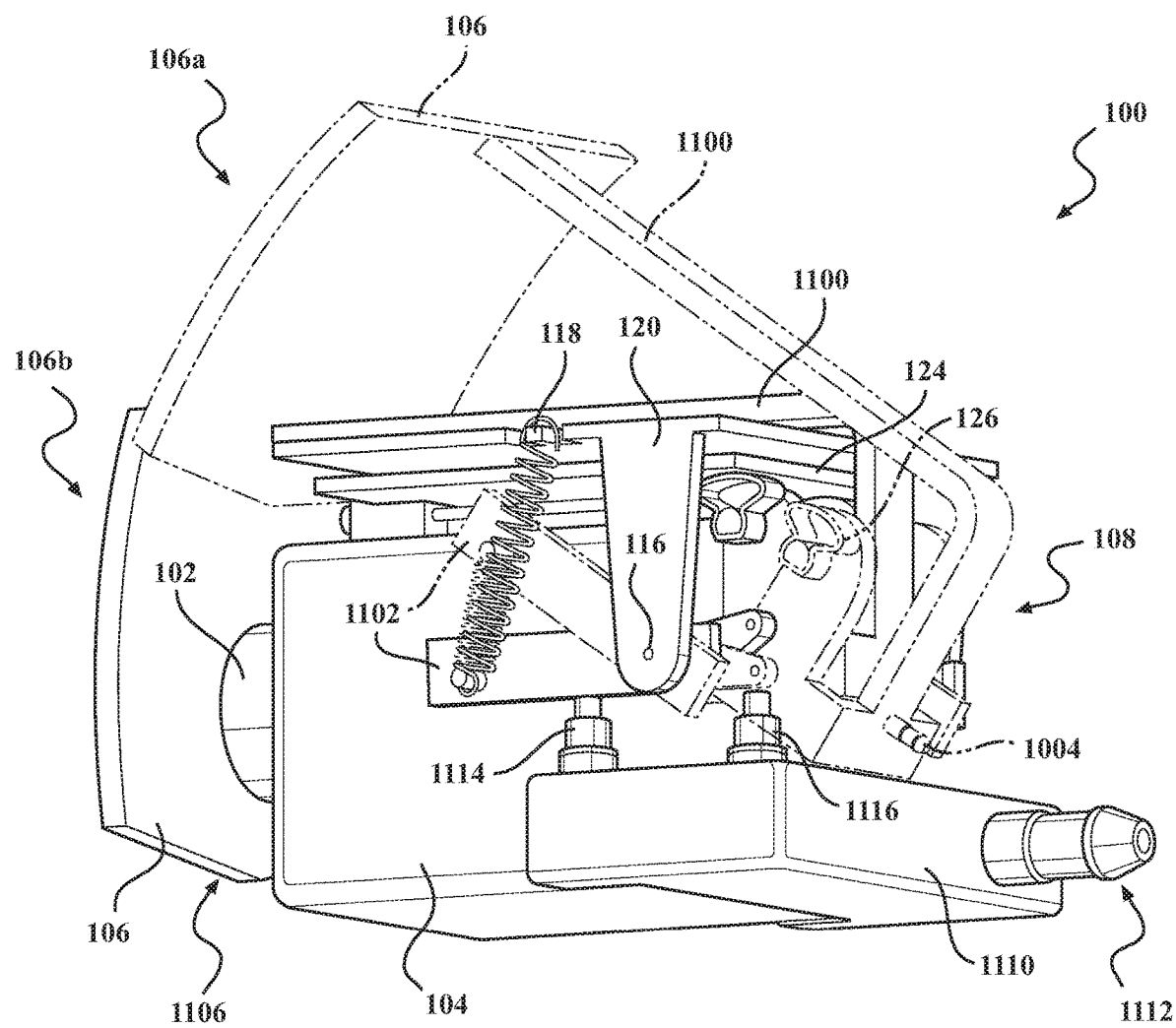
FIG. 11 is a perspective view of the cleaning device, the camera, and a fluid reservoir according to one exemplary embodiment.
Figure 12:
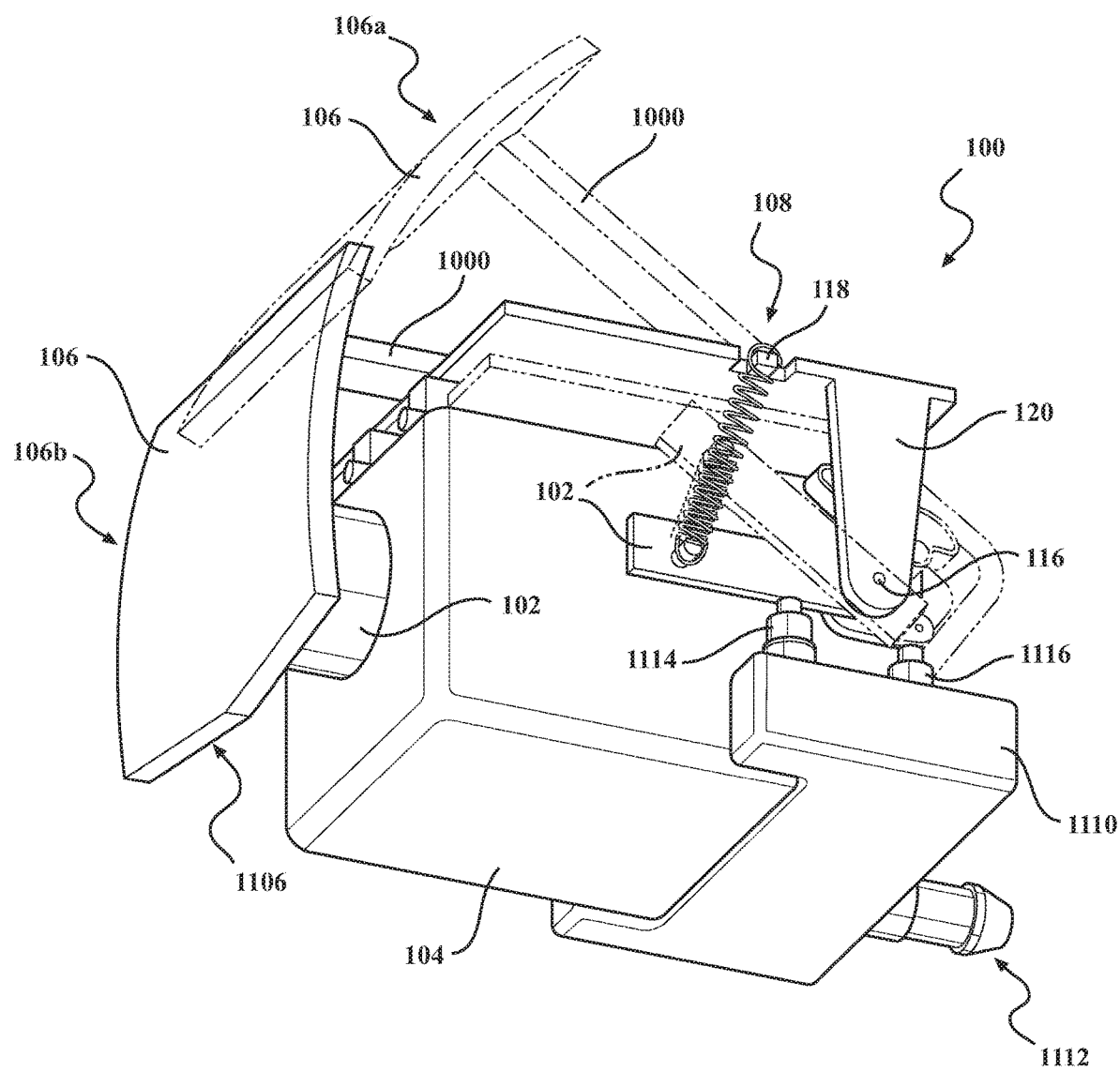
FIG. 12 is a perspective view of the cleaning device, the camera, and the fluid reservoir according to one exemplary embodiment.
Figure 13:
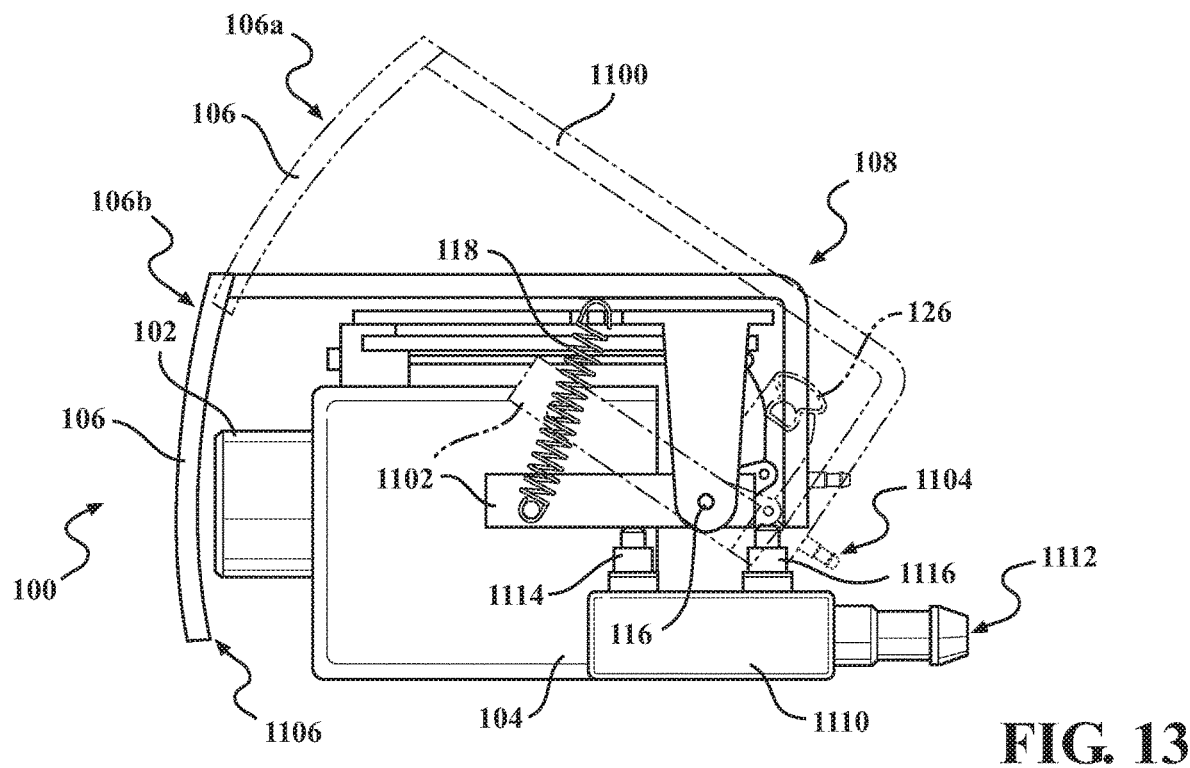
FIG. 13 is a side view of the device, the camera, and the fluid reservoir according to one exemplary embodiment.

In the exemplary embodiment shown in FIGS. 11-13, the mechanism 108 includes a center arm 1100 coupled to the cleaning element 106. The center arm 1100 is connected to a top edge (not numbered) of the cleaning element 106 near a center (not numbered) of the top edge. The center arm 1100 extends perpendicularly away from the cleaning element 106 and then bends approximately 90 degrees to run generally parallel to the cleaning element, on the other side of the camera 104. The mechanism 108 includes a pair of side arms 1102 coupled to the center arm 1100 on either side of the camera 104. The at least one spring 118 is connected to at least one of the side arms 1102.

In this embodiment, the center arm 1100 and the cleaning element 106 each define a fluidic channel (not visible). The fluidic channel includes an inlet 1104 for receiving fluid and an outlet 1106 for dispensing the fluid. The fluidic channels are in fluid communication with one another such that fluid may flow from the inlet 1104, through the center arm 1100, through the cleaning element 106, and out the outlet 1106.

In an exemplary operation, a liquid may be sent through the fluidic channels and exit the outlet 1106 onto the sensing element 102 prior to cleaning of the sensing element 102 by the cleaning element 106.

The mechanism 108 may include a fluid reservoir 1110 for storing a fluid. In one example, the fluid stored by the fluid reservoir 1110 may be the washer fluid used for cleaning the windshield of the vehicle. The fluid reservoir 1110 shown in FIGS. 11-13 defines an inlet 1112 for receiving the fluid. The fluid reservoir 1110 may include a check valve (not shown) for allowing fluid to enter the fluid reservoir 1110 through the inlet 1112, but not exit through the inlet 1112.

Figure 14:
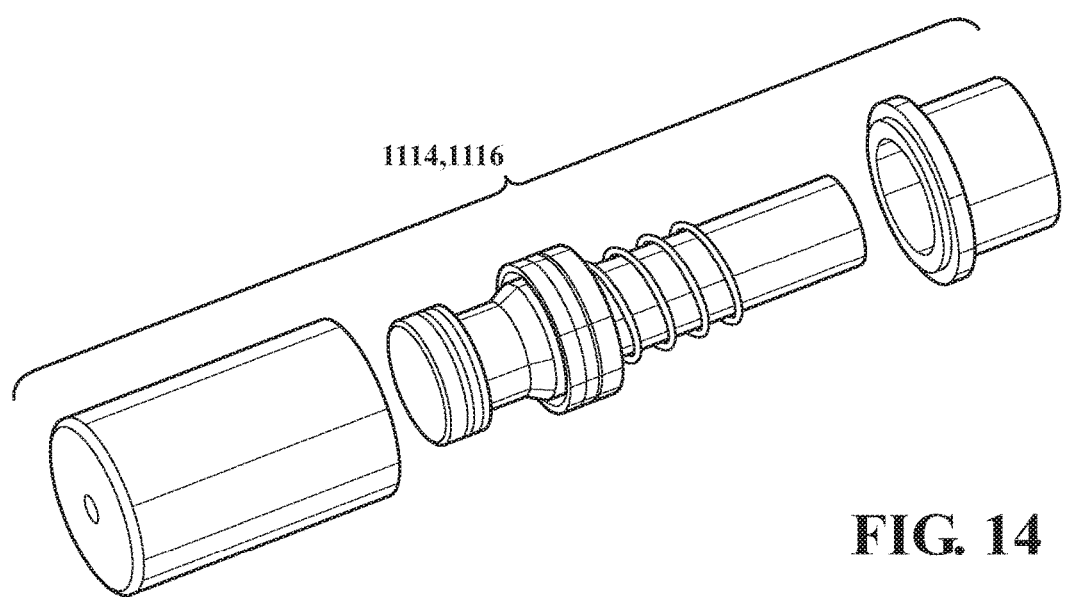
FIG. 14 is an exploded view of a valve of the fluid reservoir according to one exemplary embodiment.

The fluid reservoir 1110 of this exemplary embodiment also includes a pressurizing valve 1114 to pressurize fluid within the fluid reservoir 1110 and a dispersal valve 1116 to output fluid from the fluid reservoir 1110. FIG. 14 illustrates an exploded view of a valve that may be used as either the pressurizing valve 1114 or the dispersal valve 1116. The dispersal valve 1116 may be in fluid communication with the inlet 1104 of the fluidic channel of the center arm 1100 by, for example, a hose (not shown).

Referring again to FIG. 1, the mechanism 108 may include a printed circuit board (PCB) 124 for supporting various electrical and electronic devices (not shown). These devices may include, but are not limited to, microprocessors, microcontrollers, integrated circuits, resistors, transistors, switches, transformers, rectifiers, diodes, etc.

In the exemplary embodiments, the mechanism 108 includes at least one switch actuator 126 coupled to the at least one arm 112, 200, 1100. In the exemplary embodiments, the switch actuator 126 actuates a switch (not shown) on the PCB 124 when the cleaning device 106 has reached the second position 106b. As such, the positional status of the cleaning device 106 may be reported to a microprocessor (not shown) or similar device.

Figure 2:
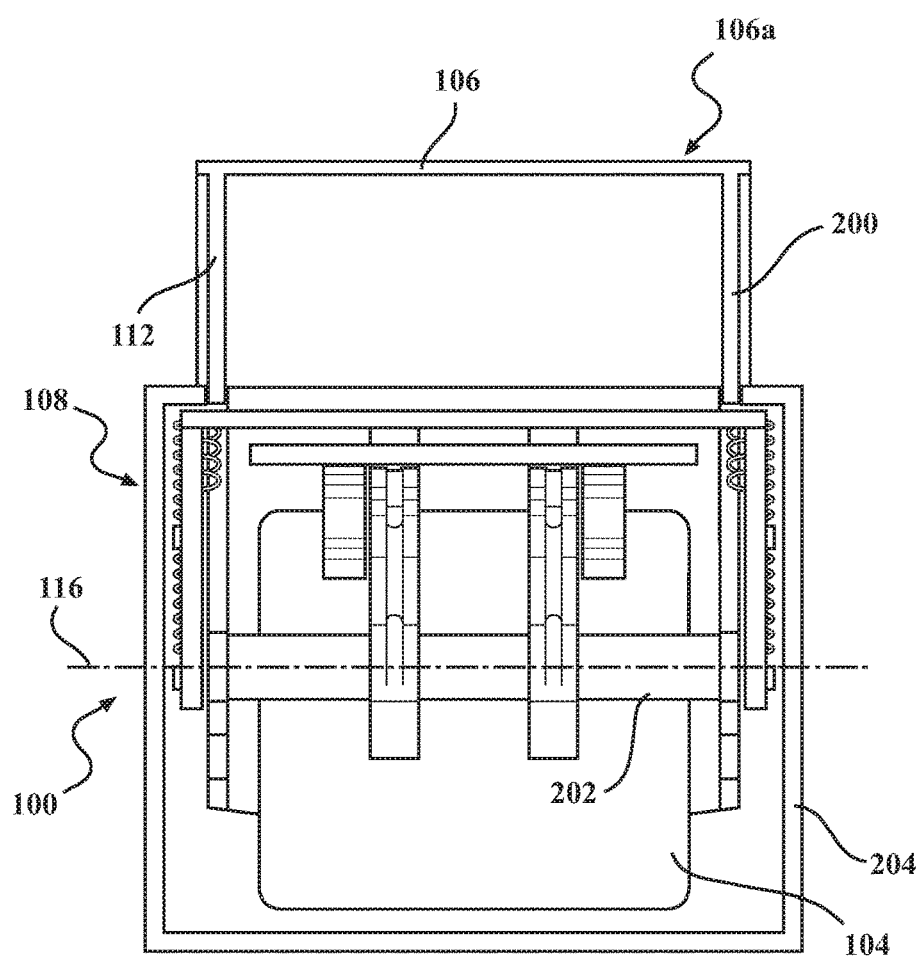
FIG. 2 is a rear view of the cleaning device and camera according to one exemplary embodiment.
Figure 7:
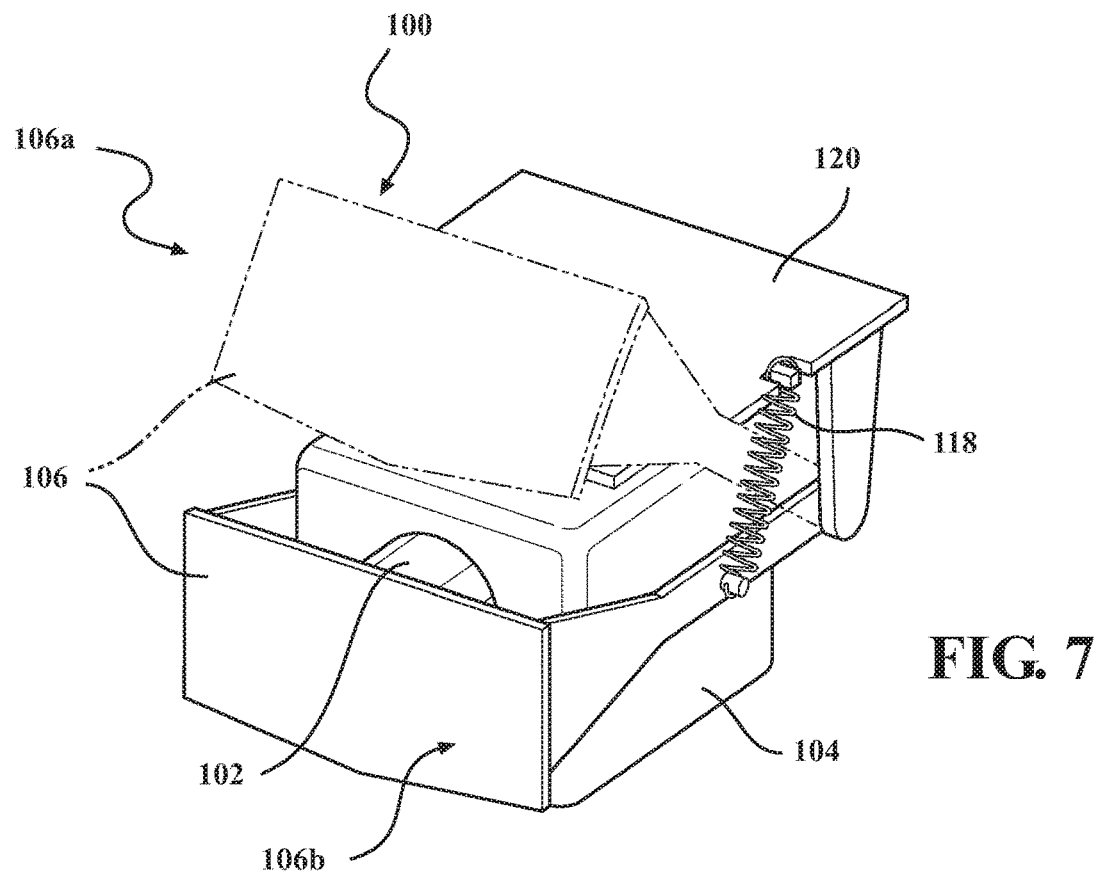
FIG. 7 is a front perspective view of the cleaning device with a housing according to one exemplary embodiment.
Figure 8:
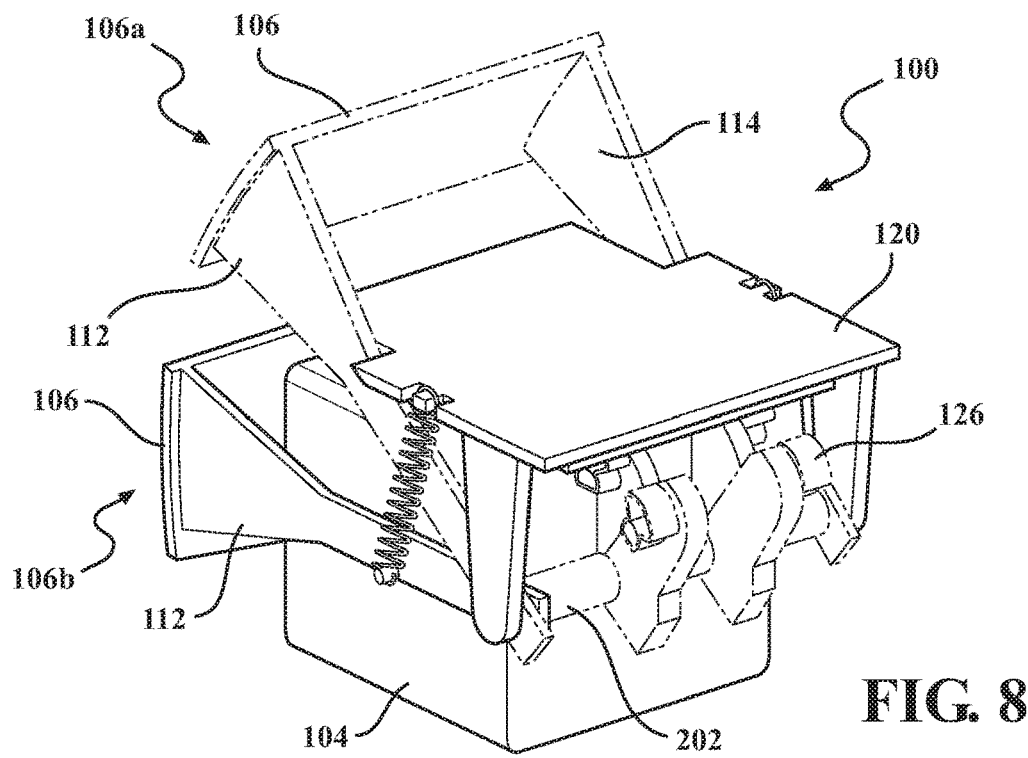
FIG. 8 is a rear perspective view of the cleaning device with the housing according to one exemplary embodiment.
Figure 10:
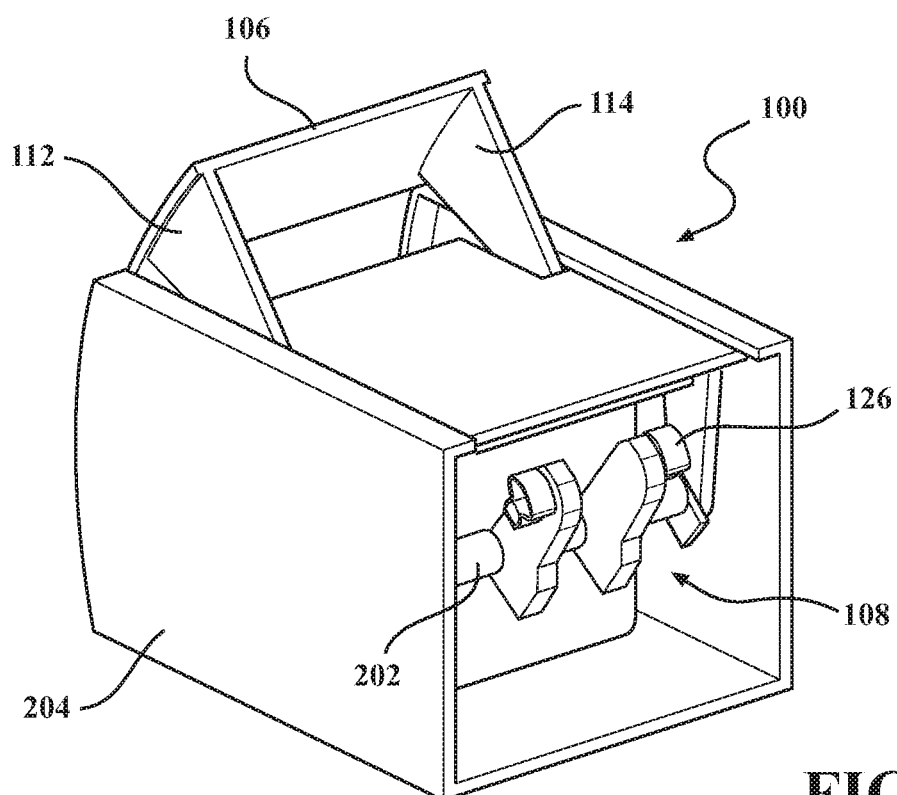
FIG. 10 is a rear perspective view of the cleaning device and the camera without the housing according to one exemplary embodiment.

Referring to FIGS. 2, 9, and 10, portions of the camera 104 and/or portions of the mechanism 102 may be surrounded by a housing 204 to protect certain elements of the camera 104 and/or the mechanism 102.

In one exemplary embodiment, a method (not shown) of operating the cleaning device 100 includes sensing a degradation of a signal supplied by the sensing element 102. This may be accomplished by software routines analyzing the signal. The method may also include applying an electric current to the shape-memory alloy 122 to actuate movement of the cleaning element 106 in response to the sensing of the degradation of the signal.

Figure 15:
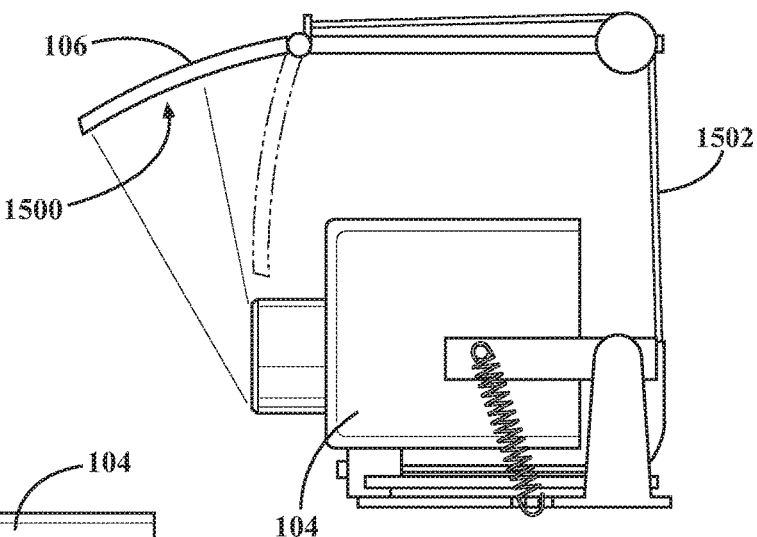
FIG. 15 is a side view of the cleaning device and camera with a target object in multiple positions according to one exemplary embodiment.

FIG. 15 shows a side view of the cleaning device 100 with a camera 104 according to another exemplary embodiment. The cleaning element 106 may be moved vertically, i.e., up and down, in order to touch the camera lens 102 to achieve lens cleaning, as described above. However, in this embodiment, the cleaning element 106 may be utilized as a targeted object 1500 to perform camera function self-test, and camera cleaning result check, as well as an online lens calibration and lens alignment test.

It is desired that the distance between the targeted object 1500 and camera lens 102 is greater than a minimum distance to obtain proper focus of the camera lens 102. As such, the targeted object 1500 may be moved horizontally to have a minimum distance to camera lens 102 to perform lens cleaning result check, and camera function self-test as well as an online lens calibration and lens alignment test. A light source (not shown) may be added to ensure pattern is visible at all times.

Movement of the targeted object 1500 may be achieved by various mechanisms. In one example, as shown in FIG.

15, a memory wire 1502, which may lengthen and/or contract based on heat and/or electric current disposed therethrough, may be utilized to drive movement of the cleaning element 106, and thus the targeted object 1500.

There are multiple options identified for presenting the targeted object 1500 and cleaning of the viewing area. Current camera technology provides a wide viewing area so the targeted object does not necessarily need to be directly before the lens.

Figure 16:
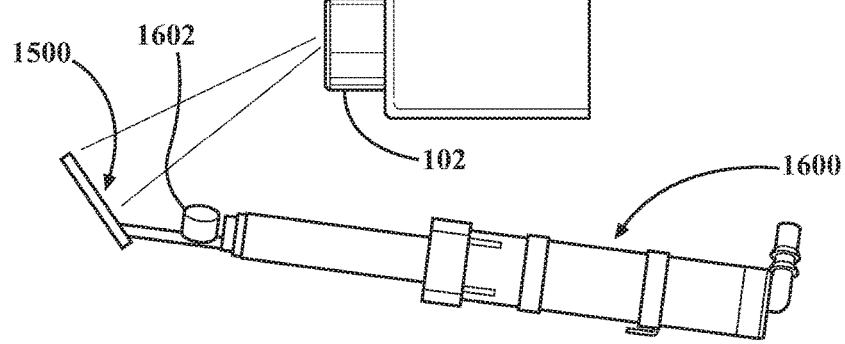
FIG. 16 is a side view of the camera, cleaning device, and target object according to one exemplary embodiment.
Figure 17:
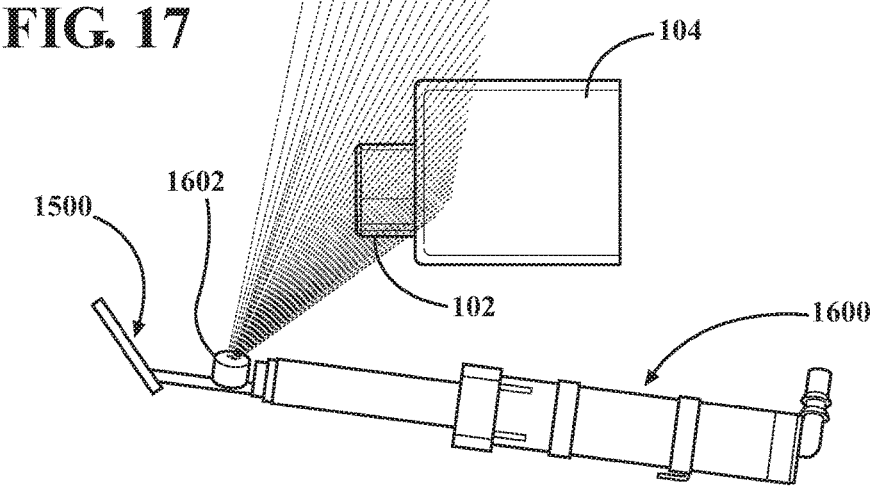
FIG. 17 is the side view of the camera, cleaning device, and target object according to the embodiment of FIG. 16 showing spraying a fluid onto the camera.

FIGS. 16 and 17 illustrate a hydraulic mechanism 1600 used to present the targeted object 1500 and clean the lens. Particularly, a spray nozzle 1602 is utilized to spray fluid on the lens 102, as shown in FIG. 17.

Figure 18:
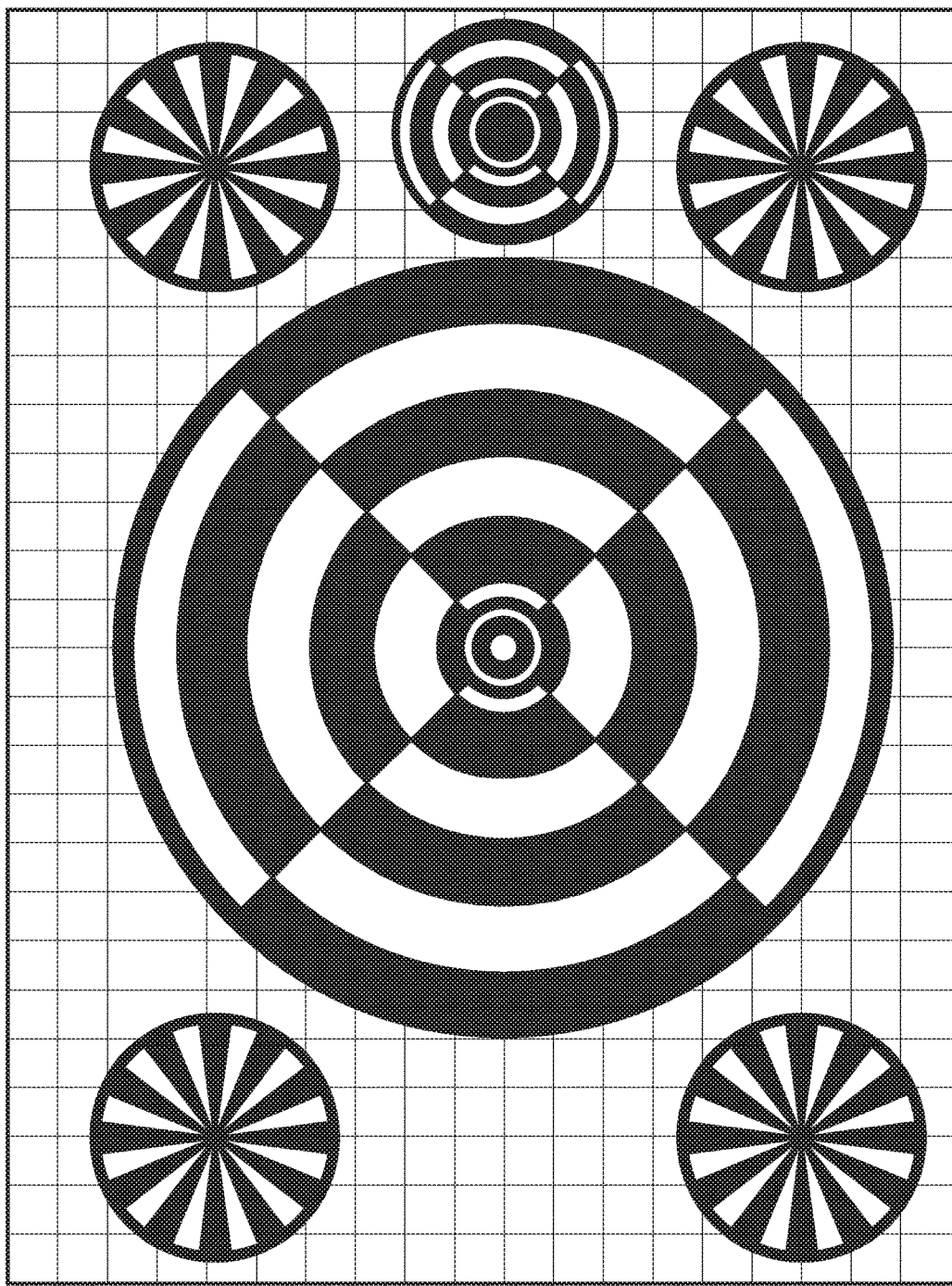
FIG. 18 is a test pattern applied to the target object according to one exemplary embodiment.

FIG. 18 illustrates one exemplary embodiment of a pattern 1800 of the targeted object 1500 used for camera self-test, camera cleaning result check, and online lens calibration and lens alignment test. A reference copy of the pattern 1800 may be stored in a non-volatile memory in the camera 104 and/or other data storage device to be used in comparison to the viewed pattern 1800. The camera 104 senses the pattern 1800 and compares it with the reference picture pattern stored in the non-volatile memory to perform a multi-function test.

Figure 19:
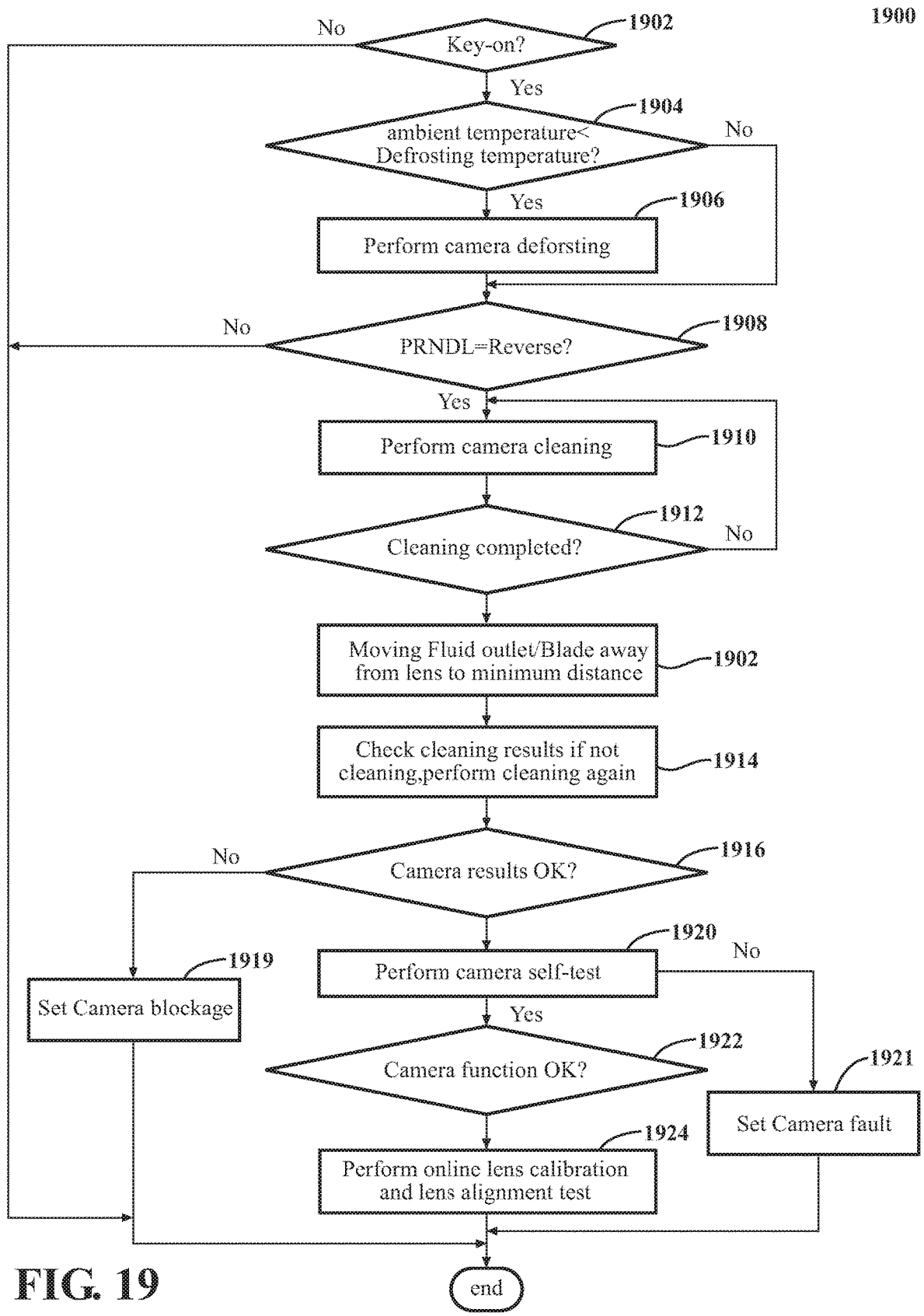
FIG. 19 is a flowchart showing a method of testing the cleaning of the camera with the cleaning device according to one exemplary embodiment.

One example of a multi-function test method 1900 is shown in FIG. 19 and described hereafter. The method 1900 described hereafter may be performed by one or more microprocessors (not shown) configured to execute a program.

After the key-on, at 1902, the method 1900 checks ambient temperature, at 1904. If ambient temperature is less than defrosting temperature (calibration value), the system performs camera ice defrosting function, at 1906, which may utilize heated fluid.

When driver switches gear selector to the reverse gear, at 1908, the method 1900 commands a camera cleaning, at 1910, because during periods of harsh weather, and when the image is obscured due to accumulation of dust and grime on the camera lens 102. The cleaning element 106 works to remove snow, slush, road salt, and/or grime that accumulates on vehicles, particularly in snowy regions.

After camera cleaning completed, at 1912, the cleaning element 106 will be maintained at a low position to the camera lens 102 with minimum distance horizontally, at 1914. At this point the camera 104 is sensing the targeted object 1500 on the inside of the cleaning element 106, at 1916, checking camera cleaning results by comparing the sensed image to the stored picture in the memory to determine if camera cleaning results are OK or not, at 1918. That is, the method 1900 checks to see if the pattern 1800 of the target object 1500 is substantially variant from the stored reference copy of the pattern 1800. If it is not, the method 1900 will command camera cleaning again, and check again. After a couple of iterations of camera cleaning operations, if camera cleaning results are still not OK, at 1918, the method sets a camera blockage fault flag, at 1919, and stops the execution.

If camera cleaning results are OK, the system starts to perform camera self-test, at 1920. It uses the sensed image from camera cleaning results check, exams the image for barrel and pincushion distortion to the stored picture pattern in the memory. The camera self-test checks camera function to make sure that it can perform function correctly, at 1922. If it does not, the camera malfunction flag is set, at 1923, and stops the execution. The camera 104 may be deactivated if the camera malfunction flag is set.

If camera self-test is completed, and there is no camera malfunction, then system performs an online lens calibration and lens alignment test, at 1924. The pattern 1800 of the picture on the inside of the fluid outlet/blade is used for online lens calibration and lens alignment test. The test can be modified from standard camera lens calibration and lens alignment test procedure.

After all tests are completed, cleaning element 106 will move back to initial position (i.e., the up position). Further, the The cleaning device shown and described herein provides several advantages of other devices. Particularly, the cleaning device assists in defrosting ice on the camera during a cold temperature condition, provides automatic self-cleaning of the camera, provides automatic self-test of the camera, and online lens calibration and lens alignment.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of operating a cleaning device for cleaning a view of a sensing element of a camera, the cleaning device having a cleaning element movable between a first position and a second position, a mechanism coupled to the cleaning element to move the cleaning element between the first position and the second position, and a secondary lens disposed between the sensing element and the cleaning element when in the second position, wherein the cleaning element engages the secondary lens, said method comprising:
    sensing a degradation of a signal supplied by the sensing element;
    applying an electric current to a shape-memory alloy to actuate movement of the cleaning element from the first position to the second position to clean the secondary lens in response to the sensing of the degradation of the signal, wherein movement of the cleaning element cleans the secondary lens; and
    utilizing the cleaning element as a targeted object to perform a camera function self-test, wherein the targeted object is disposed on the cleaning element.

2. A method of testing a cleaning device for cleaning a view of a sensing element of a camera, the cleaning device having a cleaning element movable between a first position and a second position, a mechanism coupled to the cleaning element to move the cleaning element between the first position and the second position, and a secondary lens disposed between the sensing element and the cleaning element when in the second position, wherein the cleaning element engages the secondary lens, said method comprising:
    cleaning the view of the sensing element by moving the cleaning element between the first position and the second position;
    disposing a target object within the view of the sensing element, the target object having a pattern and comprised in the cleaning element;
    sensing the pattern of the target object with the sensing element;
    storing a reference copy of the pattern in a memory;
    comparing pattern of the target object with the reference copy of the pattern;

determining that the secondary lens is clean responsive to the view of sensing element of the target object matching the reference copy within a predefined threshold; and re-cleaning the view of the sensing element in response to the pattern of the target object varying from the reference copy of the pattern outside of the predefined threshold.

3. The method as set forth in claim 2, further comprising deactivating the camera in response to the pattern of the target object being substantially variant from the reference copy of the pattern.

4. The method as set forth in claim 2, wherein the pattern comprises at least two circular regions with different shaded areas.

5. The method as set forth in claim 2, wherein moving the cleaning element comprises moving at least one arm with an actuator to move the cleaning element into engagement with the secondary lens.

* * * * *